(12) United States Patent
Mulay et al.

(10) Patent No.: US 11,270,240 B2
(45) Date of Patent: Mar. 8, 2022

(54) METHOD AND SYSTEM FOR TRANSFER ORDER MANAGEMENT

(71) Applicant: Target Brands, Inc., Minneapolis, MN (US)

(72) Inventors: Ram Avinash Mulay, Medina, MN (US); Donghoon Kang, Eden Prairie, MN (US); Dillon John Byrne, St. Paul, MN (US); Grady Michael Johnson, Eden Prairie, MN (US); Rachel Rianna Sua, Lakeville, MN (US)

(73) Assignee: TARGET BRANDS, INC., Minneapolis, MN (US)

( * ) Notice: Subject to any disclaimer, the term of this patent is extended or adjusted under 35 U.S.C. 154(b) by 205 days.

(21) Appl. No.: 16/279,740

(22) Filed: Feb. 19, 2019

(65) Prior Publication Data

US 2019/0258979 A1    Aug. 22, 2019

Related U.S. Application Data

(60) Provisional application No. 62/632,095, filed on Feb. 19, 2018.

(51) Int. Cl.
*G06Q 10/06* (2012.01)
*G06Q 10/08* (2012.01)
*H04L 29/08* (2006.01)
*H04L 67/10* (2022.01)

(52) U.S. Cl.
CPC ....... *G06Q 10/06315* (2013.01); *G06Q 10/08* (2013.01); *G06Q 10/087* (2013.01); *H04L 67/10* (2013.01)

(58) Field of Classification Search
None
See application file for complete search history.

(56) References Cited

U.S. PATENT DOCUMENTS

| | | |
|---|---|---|
| 5,712,989 A | 1/1998 | Johnson et al. |
| 8,001,017 B1 | 8/2011 | Franco |
| 2003/0101107 A1* | 5/2003 | Agarwal ............ G06Q 10/087 705/28 |
| 2004/0172344 A1* | 9/2004 | Stockwell ............ G06Q 10/08 705/28 |

(Continued)

OTHER PUBLICATIONS

International Search Report and Written Opinion in PCT/US2019/018580 dated Apr. 11, 2019, 13 pages.

(Continued)

*Primary Examiner* — Susanna M. Diaz
(74) *Attorney, Agent, or Firm* — Merchant & Gould P.C.

(57) ABSTRACT

Methods and systems for managing inventory movements are disclosed. Transfer orders are issued to move inventory from location to location in response to real-time demand events. One method includes receiving an inventory request in response to demand signals. The inventory request is analyzed to determine if inventory needs to be moved within the supply chain to satisfy the request. Origin locations are identified that have available stock of the requested items. Transfer orders are issued for each movement on an individual item basis regardless of the type of event that prompted the transfer. The transfer management system responds in real-time to inventory demands from both online and in-store sales.

19 Claims, 8 Drawing Sheets

(56) References Cited

U.S. PATENT DOCUMENTS

| | | | | |
|---|---|---|---|---|
| 2006/0190130 | A1* | 8/2006 | Fedor | G06M 7/04 |
| | | | | 700/236 |
| 2011/0173028 | A1* | 7/2011 | Bond | G16H 10/60 |
| | | | | 705/3 |
| 2013/0085901 | A1* | 4/2013 | Henderson | G06Q 10/0833 |
| | | | | 705/28 |
| 2018/0300680 | A1* | 10/2018 | Undernehr | G06Q 30/0639 |
| 2018/0302268 | A1* | 10/2018 | Lipkin | H04L 41/069 |

OTHER PUBLICATIONS

Psaltis, Andrew G., "Streaming Data: Understanding the real-time pipeline—MEAP V03", Dated Jun. 22, 2017 Manning Publications; 220 Pages.

Richardson, Chris, "Microservice Patterns—MEAP V05", Dated Oct. 25, 2017; Manning Publications; 190 Pages.

Sameer Wadkar et al.; "Flink in Action—MEAP V01"; Dated Aug. 26, 2016; Manning Publications; 35 Pages.

Wolf-Ruediger Hansen et al; "RFID for the Optimization of Business Processes", Dated Apr. 14, 2008; Wiley; 286 Pages.

Wikipedia, "Point of Sale", Retrieved from the Internet: URL:https://en.wikipedia.org/w/index/php?title=Point of sale&oldid=823985115; Feb. 4, 2018; 16 Pages.

International Preliminary Report on Patentability issued in related International Patent Application No. PCT/US2019/018580; dated Aug. 27, 2020; 6 Pages.

* cited by examiner

METHOD AND SYSTEM FOR TRANSFER ORDER MANAGEMENT

CROSS-REFERENCE TO RELATED APPLICATIONS

The present application claims priority from U.S. Provisional Patent Application No. 62/632,095, filed on Feb. 19, 2018, the disclosure of which is hereby incorporated by reference in its entirety.

TECHNICAL FIELD

The present disclosure relates generally to methods and systems for managing transfer orders. More particularly, the present disclosure describes a system architecture for managing the movement of items within a retail supply chain.

BACKGROUND

Inventory for both in-store and online sales is typically transported and stored in large groupings such as pallets. Often, inventory sits too long in some storage locations while in other locations the products run out much too quickly. Existing retail supply chain architectures require large amounts of additional stock to sit in warehouses and store rooms in order to meet customer demands for products. Storing inventory is costly, and if the inventory is not positioned well within the supply chain, delivery timeframes to customers can be lengthy. Existing inventory tracking system do not track all types of events or keep certain types of events separated.

Movement of inventory in response to real-time demand reduces the amount of time that additional stock sits at any particular location within a supply chain. Tracking transfers of items between nodes in real-time helps to provide an enterprise-wide view of the current inventory status. Tracking all types of movement events within the supply chain provides a more accurate picture of the state of inventory overall. Having the most up-to-date information about inventory levels in a supply chain enables retail entities to make more informed decisions about supply and distribution of inventory.

SUMMARY

In summary, the present disclosure relates to methods and systems for managing transfers of inventory within a retail supply chain. Various aspects are described in this disclosure, which include, but are not limited to, the following aspects.

In one aspect, a method of managing inventory transfers in real-time within an enterprise supply chain including a plurality of locations including a plurality of retail locations and a plurality of distribution locations is provided. A transfer order request message queue is monitored and real-time transfer order requests are received by a transfer order common module within a transfer order generation system. The real-time transfer order requests are received in response to demand signals issued from one or more of a demand forecasting engine, a point of sale system, and an online order system and the demand signals are inventory adjustments or sales. The transfer order requests are processed to generate individual transfer order messages for each item movement between the plurality of locations. Processing the transfer order requests includes identifying an origin location, a destination location, a quantity, and a need-by-time for each transfer order. The transfer order is broken down by item and the transfer order generation system determines whether the cost of transferring items within the supply chain is less expensive than ordering new items from vendors. A transfer order is generated for an item if the cost of transferring the item from another distribution location is less than the cost of ordering the item from a vendor. The costs include at least lost opportunity costs of having the item at the distribution location having a surplus, the cost of transporting the item, and the difference in cost for storing the item at the distribution location having a surplus vs. the distribution location having a deficit. The transfer order messages are published to a transfer order message queue by a transfer order common module. An inventory movement processor outputs messages regarding inventory movements to an inventory movement message queue. Messages regarding inventory shipment status are output, for example to a finance system.

In another aspect, a system for managing transfer orders in an enterprise including a plurality of locations including a plurality of retail locations and a plurality of distribution locations is provided. The system includes a transfer order generation system executing on a computing device. The transfer order generation system is included within an inventory management system. The transfer order generation system includes a transfer order common module configured to monitor a transfer order request message queue to receive real-time transfer order requests and, in response, publish transfer order messages to a transfer order message queue, each transfer order message of the published transfer order messages corresponding to a transfer of an individual item between the plurality of locations in the supply chain. The transfer order generation system also includes a data store managed by the transfer order common module, the data store including status information regarding transfer orders. The transfer order generation system further includes an inventory movement processor configured to output messages regarding inventory movements to an inventory movement message queue and output messages regarding inventory shipment status to a finance system. The transfer order generation system may further include a transfer order return module communicatively connected to an enterprise inventory system, a finance system, and a point of sale system. The transfer order generation system generates transfer orders in response to real-time demand signals received from a point of sale system or online ordering system. The demand signals include proactive demand signals and reactive demand signals. The inventory movements are used to replenish both in-store purchase and online orders.

In yet another aspect, a non-transitory computer-readable storage medium comprising computer-executable instructions is disclosed which, when executed by a computing system, cause the computing system to perform a method of managing inventory transfers. An inventory request message queue is monitored. Real-time inventory requests are received, wherein the inventory requests are generated in response to demand signals. The demand signals are received from one or more of a demand forecasting engine, a point of sale system, and an online order system and the demand signals are inventory adjustments or sales. The inventory requests are processed to generate individual transfer orders for each item movement between the plurality of locations. Processing of transfer order requests comprises determining whether there is sufficient stock at a destination location to satisfy the inventory request; determining whether there is sufficient stock within the supply chain to satisfy the inventory request; and determining whether the cost of transferring items within the supply chain is less expensive than ordering new items from vendors. The computing system publishes an origin location, a destination location, a quantity, and a need-by-time for each individual transfer order in transfer order messages sent to a transfer order message queue. Messages regarding inventory movements are output to an inventory movement message queue. Messages regarding inventory movements are generated by receiving transfer order information; receiving reports of items being loaded at the origin location; and receiving reports of items being unloaded at the destination location. Messages regarding inventory shipment status are output, for example to a finance system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
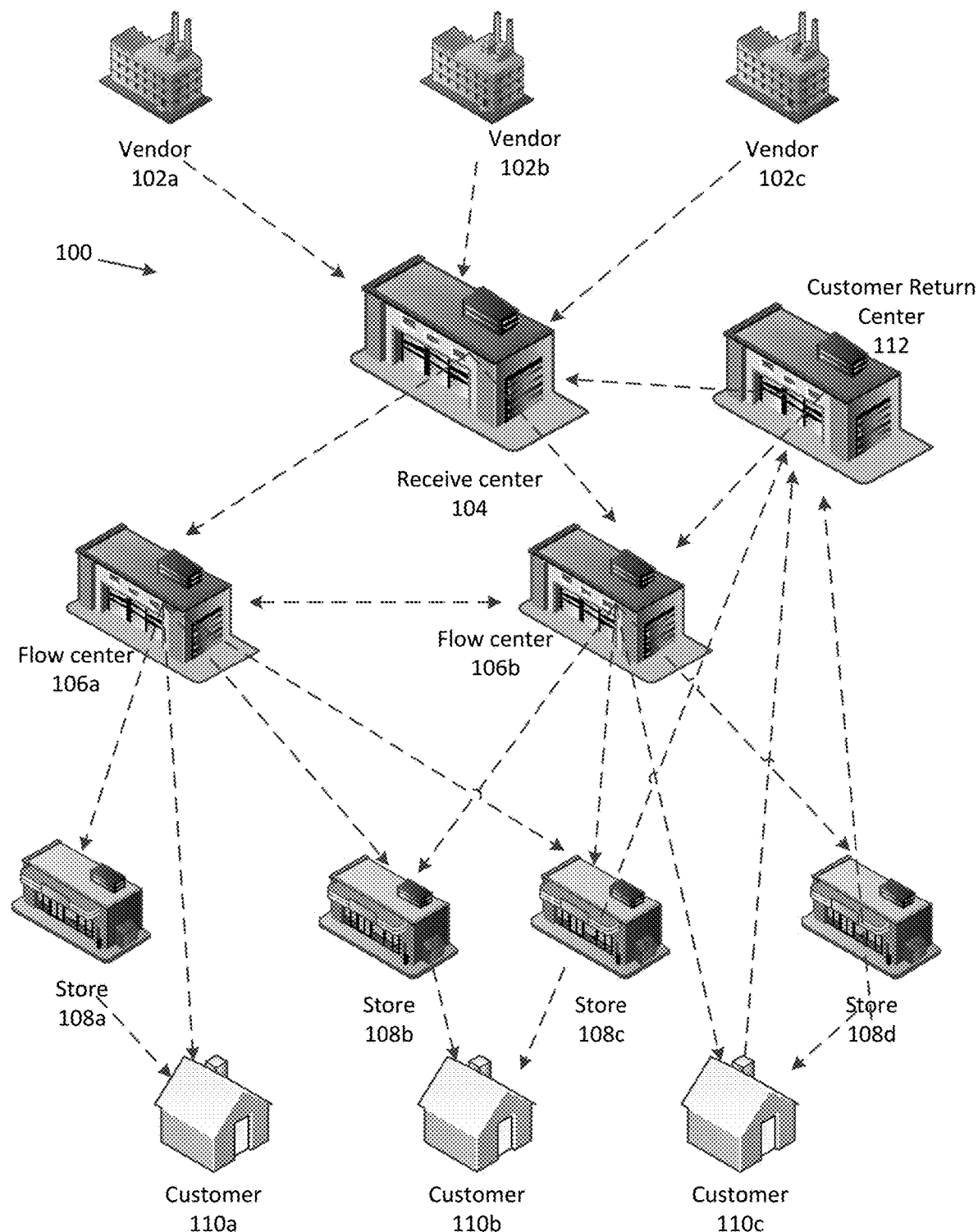
FIG. 1 illustrates a schematic diagram of an example supply chain for a retail enterprise.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to methods and systems for managing inventory movements within a supply chain. In particular, the supply chain is for a collection of retail stores that also operates an online ordering system. The supply chain management system operates to monitor and manage inventory levels in a plurality of nodes. Nodes can include retail stores and warehouses. Warehouses serve to store inventory and can also function as distribution centers. The distribution centers can have particular purposes such as a receive center for receiving products from vendors and preparing them for distribution to other nodes, or a flow center for holding inventory stock for distribution to retail stores and individual customers. The supply chain management system determines how much inventory to hold at each node and manages transfers of inventory in order to achieve the preferred amounts of inventory at each node. The movements of inventory can be based on expected demand as well as reactions to actual demand from customers.

The methods and systems described herein provide an event-driven architecture for real-time replenishment of inventory, tracked on a per-item basis. The system is both proactive and reactive. Demand forecasting is utilized to anticipate customer demand at each location for each item. In addition, the system reacts to each individual sale to replenish stocks as needed based on actual demand. The same stocks of inventory are utilized to fulfill needs for both in-store and online sales. Inventory stocks are continually rebalanced throughout the supply chain in order to position items in locations where they are mostly likely to be needed in order to reduce shipping time and storage time. The methods and systems described herein provide efficiencies in supply chain management that unexpectedly allow for both a reduction in the amount of inventory that is stored at any time, both throughout an enterprise and at retail locations in particular, while also being able to reliably respond more quickly to customer demand.

FIG. 1 illustrates a schematic diagram 100 of an example supply chain for a retail enterprise. The diagram 100 illustrates the flow of inventory from vendor 102 to customer 110. The inventory moves through various nodes to arrive at the customer. In this example, the nodes include a receive center 104, two flow centers 106a, 106b, four retail stores 108a, 108b, 108c, 108d, and three customer residences 110a, 110b, 110c. In some embodiments, the supply chain includes a customer return center 112, which receives returns from customers and/or store locations 108, 110. In practice, the supply chain could include many more nodes in different proportions. In some embodiments, there are not separate receive centers and flow centers. Instead, there may be one type of warehouse or distribution center for holding inventory before distributing to stores and customers. Arrows in the diagram indicate movement of inventory. Inventory will typically flow downward through the supply chain, but in some instances inventory may move between flow centers 106 or between retail stores 108. In some embodiments, inventory may even move from a flow center 106 to a receive center 104 or from a retail store 108 to a flow center 106.

Vendors 102 provide the items or products that will be sold by the retail entity. A purchase order is typically placed to request products from a vendor. In some instances, the vendor 102 will transport the ordered products to a receive center 104. In other instances, the retail entity arranges for the products to be picked up from the vendor 102 and transported to the receive center 104. Once at the receive center 104, the products are prepared for transportation to one or more flow centers. The products may arrive from the vendors in large groupings that need to be broken down into individual units for distribution to flow centers 106 and/or stores 108. Accordingly, once received into the supply chain of the enterprise, each individual unit can be tracked and shipped among the various nodes of the supply chain (receive centers 104, flow centers 106, and stores 108).

A variety of products are prepared for shipment to one or more flow centers 106. The flow centers 106 are typically positioned to enable quick shipment to one or more retail stores 108. Each flow center 106 may supply inventory to multiple retail stores 108. In some instances, more than one flow center 106 will send inventory to a retail store 108. For example, in FIG. 1, flow center 106a distributes inventory to stores 108a, 108b, and 108c. Flow center 106b distributes to stores 108b, 108c, and 108d. In some instances, to the extent products received at a flow center 106 are not already broken down into individual units, the products may be broken down into individual units in order to distribute individual items to stores 108, or optionally to fill online orders that will be delivered directly to customers from the flow center 106 or store 108. In the example of FIG. 1, products are shipped directly from flow center 106*a* to a customer 110*a* and from flow center 106*b* to customer 110*c*.

Once products arrive at the retail stores 108, they are either stored in a back room or displayed on shelves. This inventory is available for in-store purchases, pick-up orders, or local delivery. Depending on the location of a customer ordering products online, the shipments of products could come from one or more retail stores 108, or flow centers 106. For instance, customer 110*b* could receive shipments of products from either store 108*b* or store 108*c*, or both (in the instance of a multi-item purchase).

In some embodiments, the supply chain includes one or more customer return centers 112. The customer return center 112 processes items that are returned to a retailer. Returns can be received from stores 108 or directly from customers 110. In the example of FIG. 1, the customer return center 112 is shown receiving returns from stores 108*c* and 108*d* as well as customer 110*c*. Once the returned items are processed, they can be returned to a receive center 104 or a flower center 106. In some instances, returns may be received at a store 108 and is placed back onto shelves or kept in storage to fulfill online orders placed by customers 110 for home delivery.

It is noted that, between receive centers 108, flow centers 106, stores 108, and customer return centers 112 there may be preexisting, predetermined delivery routes established. For example, there may be daily or weekly transit routes between a receive center and one or more flow centers. The receive center can provide to the flow centers the selection of individual items that are needed by stores 108 serviced by the one or more flow centers proximate to and/or servicing those stores. The flow centers can also have daily or other periodic transportation routes established to stores that are serviced, thereby ensuring prompt replenishment of items at stores in response to item sales.

In addition, the predetermined delivery routes can be used for various purposes. For example, in some situations, the predetermined delivery routes can be used to deliver products in various forms. As explained in further detail below, items distributed via the supply chain are tracked on an individual (per-item) basis; as such, items can be delivered to stores 108 in any convenient manner. In some example embodiments, items are tracked on an individual basis, but may be grouped at a flow center 106 to simplify restocking of the store 108, for example by placing together in a package a collection of individual items of different types but which may easily be stocked conveniently once those items arrive at a store 108. For example, goods that are located in a common department, row, or shelf of a store can be grouped and packed together at the flow center 106. Once those items reach the store 108, a restocking operation can restock each of the items in that shelf, row, or department easily. Still further, because items are packed and tracked on an individual basis at the flow center and sent to stores based, at least in part, on demand signals received from stores, the item collections are based on the number of items sold and therefore the restocking operation can provide a package of items that will fit on store shelves, rather than requiring additional backroom stocking and storage.

In the context of the present disclosure, a supply chain management system is provided that assists in coordination of product shipments among nodes of the supply chain, and uses inventory models to automatically rebalance inventory within the supply chain of the enterprise to ensure predicted and actual item demand from customers of the enterprise is fulfilled to a predetermined threshold success rate. The supply chain management system allows for balancing of items across the supply chain based on inventory and demand models, as well as real time demand signals, and performs automated generation of purchase and transfer orders throughout the supply chain based on such demand and lead time calculations between paints both within and external to the supply chain. Accordingly, as noted below, substantial advantages are realized using the methods and systems of the present disclosure.

It is in this general supply chain retail environment that the following systems and methods operate. While the methods and systems are described in a retail environment having brick-and-mortar stores as well as online sales, additional applications are possible. For example, the systems and methods could operate in a supply chain of warehouses that only distribute products to customers in fulfillment of online orders. In other embodiments, the systems and methods could operate for distribution channels that distribute supplies to multiple locations within a business rather than selling to individual customers. Regardless of the application, the systems and methods described herein are most beneficial when used to manage a supply chain for a plurality of nodes with the goal of increasing efficiency of inventory movement by responding to both proactive and reactive demand signals in real time, on a per-item basis.

It is noted that the methods and systems described herein are particularly advantageous for high-throughput inventory processing, and in particular, high-throughput inventory processing on a per-item basis.

Figure 2:
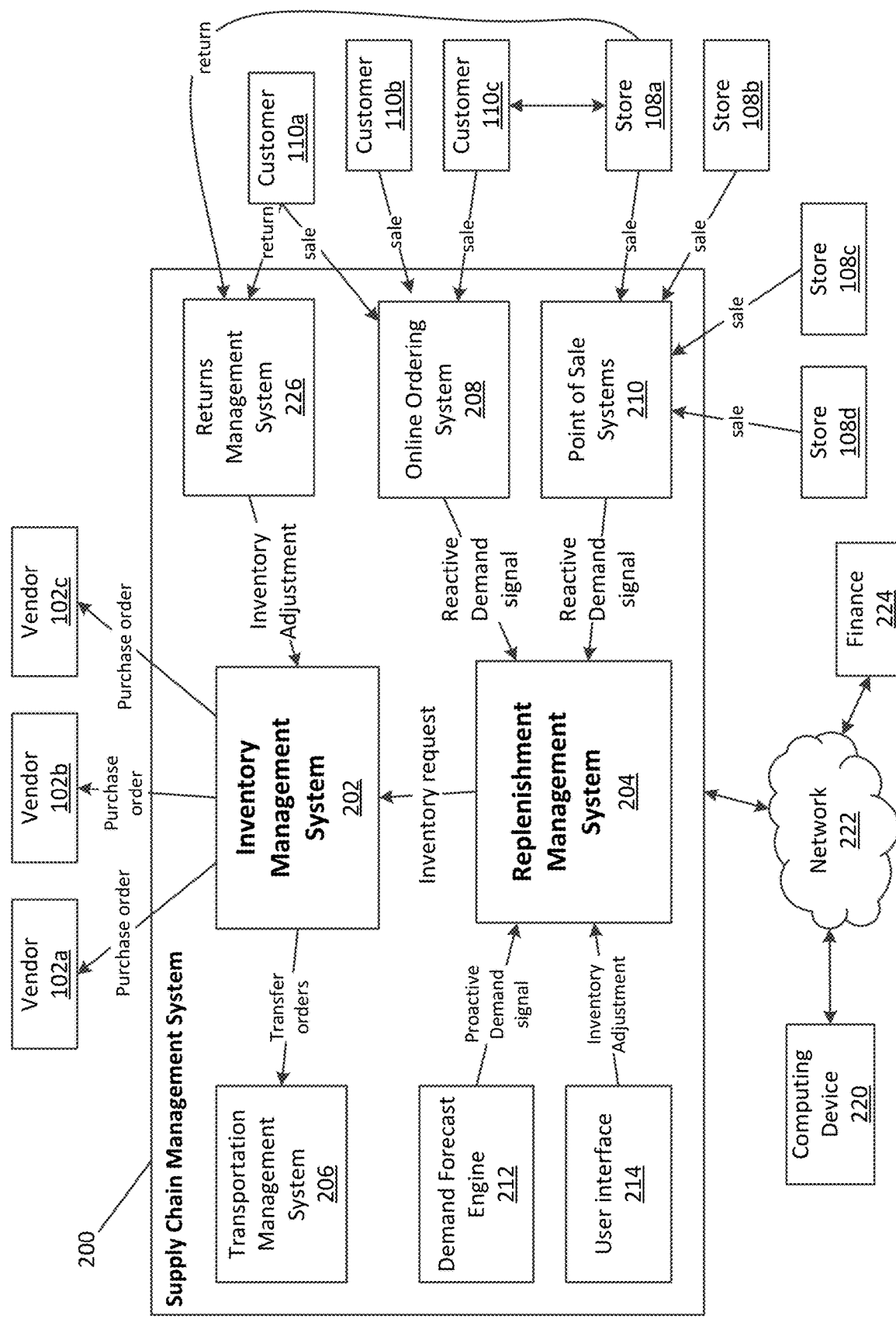
FIG. 2 illustrates a schematic diagram of an example supply chain management system.

FIG. 2 illustrates a schematic diagram of an example system 200 for managing a supply chain. Components of the supply chain management system 200 include an inventory management system 202 and a replenishment management system 204. Together, the inventory management system 202 and replenishment management system 204 operate to monitor inventory levels across all nodes of a supply chain, determine if and when adjustments to inventory levels need to be made, and facilitate transport of inventory between nodes to respond to customer demand.

The inventory management system 202 receives inventory requests from the replenishment management system 204. In response to the inventory requests, the inventory management system 202 determines whether additional inventory is needed at one or more nodes within the supply chain to satisfy the request. Additional inventory may be transported to one node from another node if sufficient stock of the needed product(s) is available within the required timeframe within the supply chain. In such instances, transfer orders are issued to the transportation management system 206. If the inventory management system 202 determines that there is not sufficient stock of the requested products at another node or that transporting the products within the supply chain would be too costly or time consuming, additional stock is ordered from one or more vendors 102 through purchase orders issued from the inventory management system 202. The inventory management system 202 is further described with respect to FIG. 3.

In the embodiment shown, the replenishment management system 204 receives demand signals from one or more sources including an online ordering system 208, one or more point of sale systems 210, and a demand forecast engine 212. The demand signals can be proactive or reactive.

Proactive demand signals are received from the demand forecast engine 212 and are generated by predicting expected customer demand for individual products on a day by day basis. Reactive demand signals are received from the point of sale system 210 (e.g., a point of sale network distributed across stores 108 within the enterprise) or through the online ordering system 208. The online ordering system 208 receives orders from customers 110 and coordinates fulfillment of those orders. The point of sale systems 210 record sales that are made at stores 108. The replenishment management system 204 also receives inventory adjustments from the user interface 214. Inventory adjustments are instructions received from a user to modify inventory levels at one or more locations or nodes within the supply chain. Inventory adjustments may be made for reasons other than expected or actual customer demand for particular items. The replenishment management system 204 is further described with respect to FIG. 3.

In some embodiments the supply chain management system 200 communicates with a computing device 220 through a network 222. The network 222 can be any of a variety of types of public or private communications networks, such as the Internet. The computing device 220 can be any network-connected device including desktop computers, laptop computers, tablet computing devices, smartphones, and other devices capable of connecting to the Internet through wireless or wired connections. In some instances, the supply chain management system 200 also communicates with a finance system 224 through the network 222. In some embodiments, transfer order information is aggregated before being communicated with the finance system 224 (e.g., to accommodate interaction with a finance system 224 that may not be configured for per-item transaction information).

Figure 3:
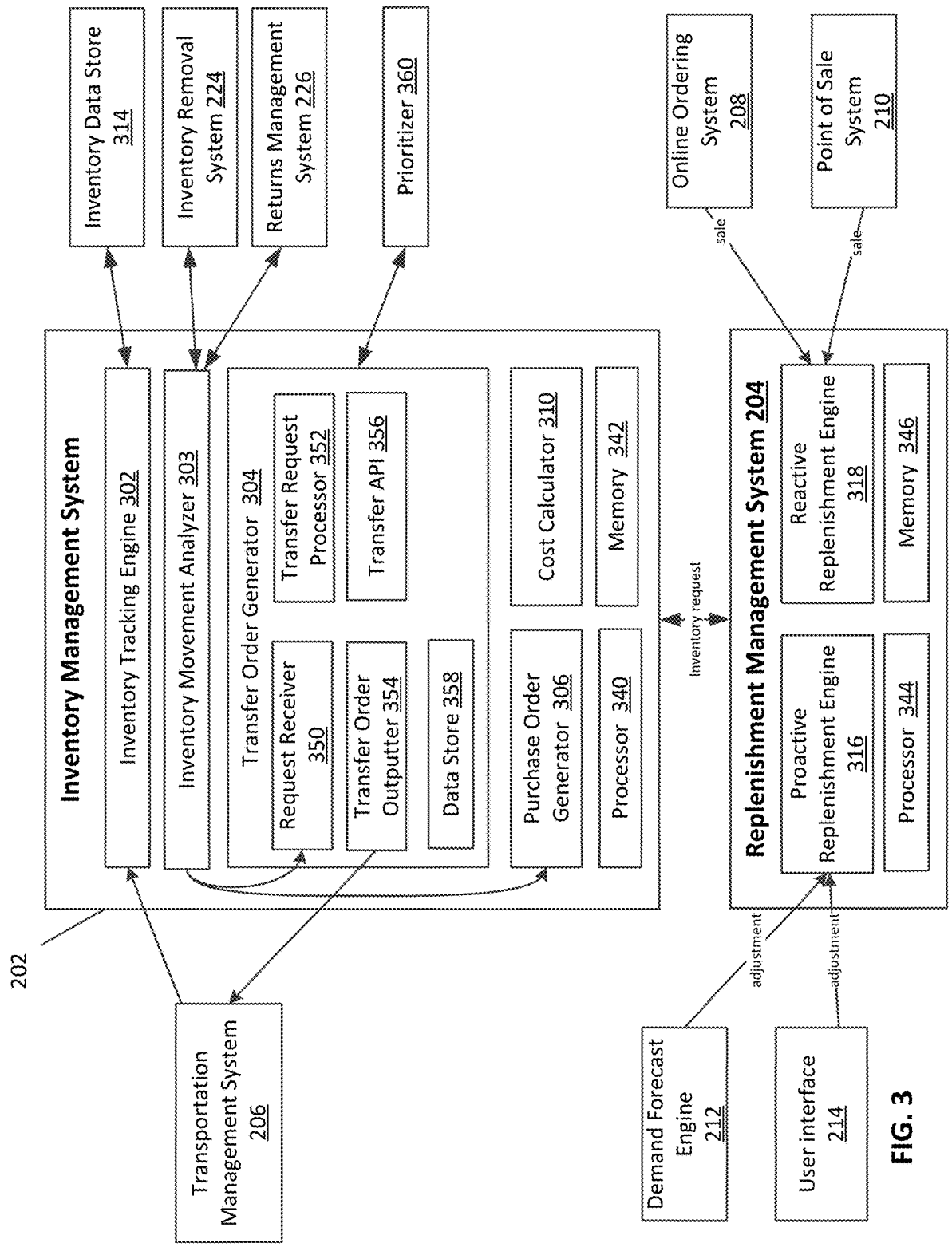
FIG. 3 illustrates a more detailed view of the replenishment management system and inventory management system of FIG. 2.

FIG. 3 shows a more detailed schematic of the inventory management system 202 and replenishment management system 204. The inventory management system 202 includes an inventory tracking engine 302, an inventory movement analyzer 303, a transfer order generator 304, a purchase order generator 306, and a cost calculator 310. The inventory management system 202 also includes a processor 340 and memory operatively connected to the processor 342, and storing operating instructions that implement the operative components (300-308, above) of the system 202. An example computing system or systems with which system 202 can be implemented is illustrated below in connection with FIG. 4.

The inventory tracking engine 302 operates to monitor inventory levels at each warehouse and store in the supply chain. The inventory tracking engine 302 also receives inputs from the transportation management system 206 regarding the movement of inventory between nodes. The inventory tracking engine 302 receives information regarding transfer orders that are generated by the transfer order generator 304. Inventory coming into the supply chain from vendors is recorded by the inventory tracking engine 302 as well as inventory leaving the supply chain to satisfy sales. The inventory tracking engine 302 also receives notifications when inventory leaves an origin location within the supply chain or arrives at a destination location. Updates to inventory records are saved in an inventory data store 314. The inventory tracking engine 302 serves as a single source of information for that status of every aspect of inventory within a supply chain for a retail enterprise. In some embodiments, the inventory tracking engine 302 can be implemented as disclosed in copending U.S. patent application Ser. No. 15/898,837, entitled "Method and System for Supply Chain Management,", the disclosure of which is hereby incorporated by reference in its entirety.

The inventory movement analyzer 303 receives status updates from the inventory tracking engine 302 and analyzes the changing inventory levels at each node within the supply chain to determine if any inventory movements are needed. The inventory movement analyzer 303 receives inventory requests from the replenishment management system 204, the inventory removal system 224, and the returns management system 226. Based on these inventory requests, the inventory movement analyzer 303 determines whether the inventory levels are at their preferred levels. The preferred levels are determined on a per-item basis for each day by the replenishment management system 204. The inventory movement analyzer 303 evaluates the current inventory levels at each node and compares them to that day's goal and the following day's goal to determine if inventory movements need to be changed to redistribute inventory.

The inventory movement analyzer 303 determines how items should be moved between nodes of the supply chain, based on the inventory goals. If inventory is available within the supply chain to satisfy an inventory request and the costs are not too high to move the inventory, the inventory movement analyzer 303 will send a signal to the transfer order generator 304. If the inventory movement analyzer 303 determines that there is insufficient supply of an item within the supply chain to satisfy an inventory request or that the cost of moving items outweighs the cost of ordering new stock, the inventory movement analyzer 303 sends a signal to the purchase order generator 306. This process is further described in FIG. 6.

The inventory removal system 224 and returns management system 226 provide inputs to the inventory movement analyzer 303 to request the movement of inventory within the supply chain. The inventory removal system 224 is responsible for removing items from the supply chain. In some instances, the items will be automatically removed after a period of time, for example, after a predetermined shelf life for perishable produce and other fresh grocery items. In other instances, the items are removed after the inventory removal system 224 receives a notification to remove one or more items from the supply chain. For example, one or more seasonal items may be removed at the conclusion of a particular shopping season. In another example, as discussed below, the items could be removed following a return if the items are no longer in condition for re-sale to another customer. Items may need to move to different nodes in order to be properly removed from the supply chain.

The returns management system 226 operates to determine how to redistribute items that have been returned by customers following a purchase. In some instances, the returned item or items are transferred to other nodes or remain where they were received from the customer. Those items are then made available for re-sale to another customer. In other instances, the returned item or items are not eligible for re-sale and are marked for removal from the supply chain by the inventory removal system 224.

In some instances, items can be returned to a retail store location. From the retail store, the items can be placed on the shelves at that store or sent to the customer returns center. These movements are initiated with transfer orders that are processed through the inventory management system 202. In other instances, returns may be transported from a customer directly to the customer returns center for redistribution or removal.

The transfer order generator 304 communicates with the transportation management system 206 to transfer stock of products from one node to another. Transfer orders are generated when the inventory management system 202 has received an inventory request from the replenishment management system 204 and the inventory movement analyzer 303 has determined that the additional inventory can be moved from another node. The transfer order generator 304 includes a request receiver 350, a transfer processor 352, a transfer order outputter 354, a transfer API 356, and a temporary data store 358. The transfer order generator 304 is further described in relation to the method of FIGS. 5-8.

The request receiver 350 receives inventory movement requests from the inventory movement analyzer 303. In some embodiments, the request receiver 350 reads transfer order messages from a topic of a streaming data service are received from the inventory movement analyzer 303.

The transfer processor 352 analyzes the movement requests to identify individual transfers of items that are needed to satisfy the movement requests. Each transfer has a defined origin, destination, and item identifier.

The transfer order outputter 354 communicates the transfer orders to the transportation management system 206. In some embodiments, the transfer order outputter 354 communicates transfer order messages to a streaming data topic that is read by the transportation management system 206.

The transfer API 356 integrates with other systems involved in supply chain management. For example, finance 224 and/or the inventory data store 314 can access information from the transfer order generator 304 via the transfer API 356. In some embodiments, the transfer order information is aggregated before being accessed through the API 356 instead of remaining separated for each individual item.

The data store 358 stores the requests and other information regarding transfers of inventory that are needed to process transfer orders. In some embodiments, the data store 358 includes a temporary data store that stores the individual messages for each item that is to be transferred. In some embodiments, the messages are stored in a noSQL database such as MongoDB in order to handle a massive quantity of messages required to initiate continuous, individual transfers for a large retail chain. In some embodiments, the transfer messages can be transferred to more compact, permanent, long-term storage.

In example embodiments, the inventory management system 202, and transfer order generator 304 in particular, interacts with a prioritizer 360. The prioritizer 360 may expose an API that may be called by the transfer order generator 304 to determine a desired priority of transfers to be performed. Accordingly, the transfer order generator 304 may prioritize transfer orders that are sent to the same node within the supply chain. A set of rules are established to govern how transfer orders are prioritized. Transfer orders are continually communicated to the transportation management system 206 which then communicates the transfer orders to computing devices at each node. In some instances, the transfer orders cannot be fulfilled as quickly as they are received by the transportation management system 206. In those instances, a prioritized list of transfer orders (e.g., transfer orders listed in priority order, or transfer orders that include assigned priority levels) can be periodically obtained at the node computing devices. This list is utilized at the nodes to determine which items to prepare for shipment first.

The purchase order generator 306 sends orders to vendors for additional stock of products. Purchase orders are generated when the inventory management system 202 has received an inventory request and the inventory movement analyzer 303 in conjunction with the cost calculator 310 has determined that it would be more cost and/or time efficient to get the additional inventory from a vendor than from another node. Purchase orders are communicated to the transportation management system 206 in order for transportation of the products from the vendor to a receive center to be arranged.

To help determine the best use of inventory, the cost calculator 310 will calculate the total cost for each movement option. The total cost will be the sum of the direct cost (fulfillment and transportation costs) and the opportunity cost. The opportunity cost will reflect the potential return on inventory for an alternative use of the inventory (e.g. if the reactive replenishment engine 318 uses inventory to fulfill an online order, the inventory will not be used to meet a replenishment need—the calculation will quantify the impact of not replenishing). The calculation will be designed to achieve the following priorities: 1) meet promise for a guest order; 2) lower the risk of a lost sale or being out of stock in a store; and 3) minimize the direct and opportunity costs associated with a unit of inventory. The inventory movement analyzer 303 with the cost calculator 310 will recommend vendor purchases over rebalancing moves when transportation costs are excessive.

The transportation management system 206 receives instructions from the inventory management system 202 to transport inventory between nodes of the supply chain. This includes shipping stock from vendors to warehouses to stores and then to customers. The transportation management system 206 receives transfer orders and purchase orders from the inventory management system 202 and arranges for the transportation of the requested products. In some embodiments, the transportation management system 206 reads messages from a streaming data service topic for transfer orders. Each message describes an origin, destination, and item identifier for each individual item that is to be moved within the supply chain. The transportation management system 206 determines the best way to move items from place to place within given time periods in the most cost effective way.

The inventory data store 314 houses information about current inventory levels at all of the nodes within the supply chain. Inventory levels are recorded for each item or product. The inventory data store 314 also stores information about the ideal inventory levels for each location for each day. The inventory data store 314 is continually updated by the inventory tracking engine 302.

The replenishment management system 204 includes a proactive inventory replenishment engine 316 and a reactive inventory replenishment engine 318. The replenishment management system 204 also includes a processor 344 operatively connected to a memory 346, which stores executable instructions comprising components 316-322. The replenishment management system 204 receives demand signals from the demand forecast engine 212, the user interface 214, the point of sale system 210, and the online ordering system 208.

The proactive replenishment engine 316 receives proactive demand signals from the demand forecast engine 212 and user interface 214 in the form of inventory adjustments. The reactive replenishment engine 318 receives reactive demand signals from the point of sale system 210 and the online ordering system 208 in the form of sales. Reactive replenishment ensures that stock levels remain at the preferred levels to meet customer availability goals. An example of a reactive replenishment engine is described in copending U.S. patent application Ser. No. 16/172,575, entitled "Method and System for Generating Ensemble Demand Forecasts," the disclosure of which is hereby incorporated by reference in its entirety.

The online ordering system 208 receives orders from customers made online. The online ordering system 208 processes the orders and submits them to the replenishment management system 204 for processing. The transportation management system 206 and inventory management system 202 operate together to fill the order and deliver the ordered products to the customer in the need-by time.

The online ordering system 208 operates in conjunction with the reactive replenishment engine 318 to determine which items are available within the inventory and the timeline in which the customer can receive the item either in-store or by home delivery. The inventory will be segmented based on when the items can be delivered to the customers. The online ordering system 208 interfaces with the inventory tracking engine 302 to determine the current location of items and calculate how long it will take for an item to reach a customer. These calculated times are used to provide delivery windows for a customer ordering an item.

There will be instances in which a replenishment order, proactive transfer order, reactive transfer order or online order will compete for a unit of inventory in any flow center or receive center. In these situations where there is more demand for the units than forecasted, the reactive replenishment engine 318 will be required to tradeoff between replenishment, pro-active transfer and fulfillment needs to determine which order to assign the units. Additionally, there may be situations where the replenishment management system 204 issues a vendor purchase request because it is less expensive than the transportation costs required to rebalance inventory.

A point of sale system 210 sends reactive demand signals to the reactive replenishment engine 318. In the embodiment illustrated in FIG. 3, there is only one point of sale system 210. In other embodiments, there may be multiple point of sale systems or no point of sale systems. The point of sale system 210 records sales made in retail stores and reports those sales to the reactive replenishment engine 318. The reactive replenishment engine 318 then determines if inventory levels need to be replenished at one or more nodes of the supply chain in order to achieve the ideal inventory positions for the following day.

Additional details regarding the overall supply chain architecture, and in particular a relationship between the inventory management system 202 and other aspects of an enterprise supply chain, are described in copending U.S. patent application Ser. No. 15/898,837, entitled "Method and System for Supply Chain Management," the disclosure of which is hereby incorporated by reference in its entirety above.

Figure 4:
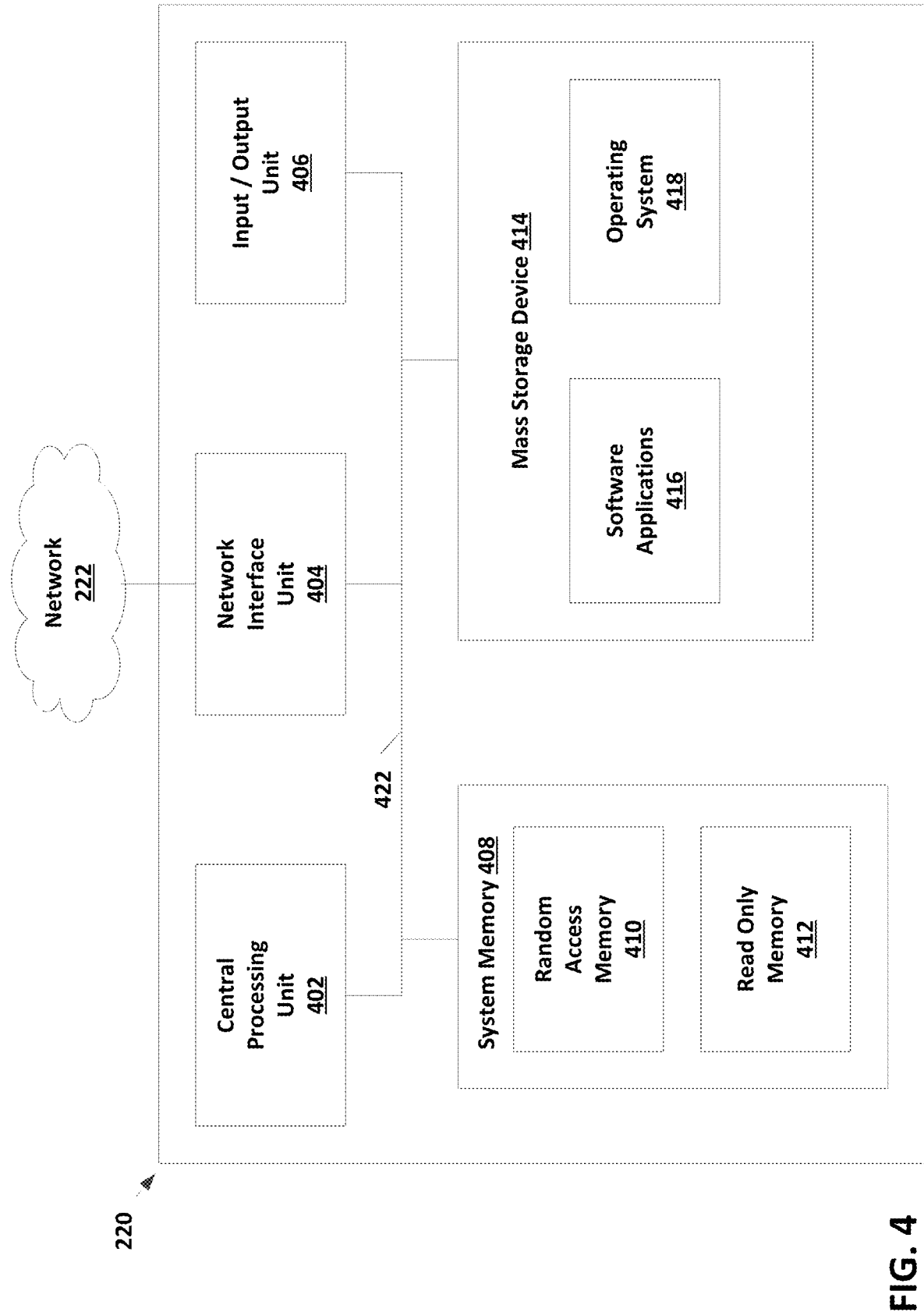
FIG. 4 illustrates an example block diagram of a computing system usable in the supply chain management system of FIG. 2.

Referring now to FIG. 4, an example block diagram of a computing system 220 is shown that is useable to implement aspects of the supply chain management system 200 of FIG. 2. In the embodiment shown, the computing system 220 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing system 220, such as during startup, is stored in the ROM 24412. The computing system 420 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing system 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 220.

According to various embodiments of the invention, the computing system 220 may operate in a networked environment using logical connections to remote network devices through a network 222, such as a wireless network, the Internet, or another type of network. The computing system 220 may connect to the network 222 through a network interface unit 404 connected to the system bus 422. It should be appreciated that the network interface unit 404 may also be utilized to connect to other types of networks and remote computing systems. The computing system 220 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing system 220 can store software instructions and data. The software instructions include an operating system 418 suitable for controlling the operation of the computing system 220. The mass storage device 414 and/or the RAM 410 also store software instructions, that when executed by the CPU 402, cause the computing system 220 to provide the functionality discussed in this document. For example, the mass storage device 414 and/or the RAM 410 can store software instructions that, when executed by the CPU 402, cause the computing system 220 to receive and analyze inventory and demand data.

Figure 5:
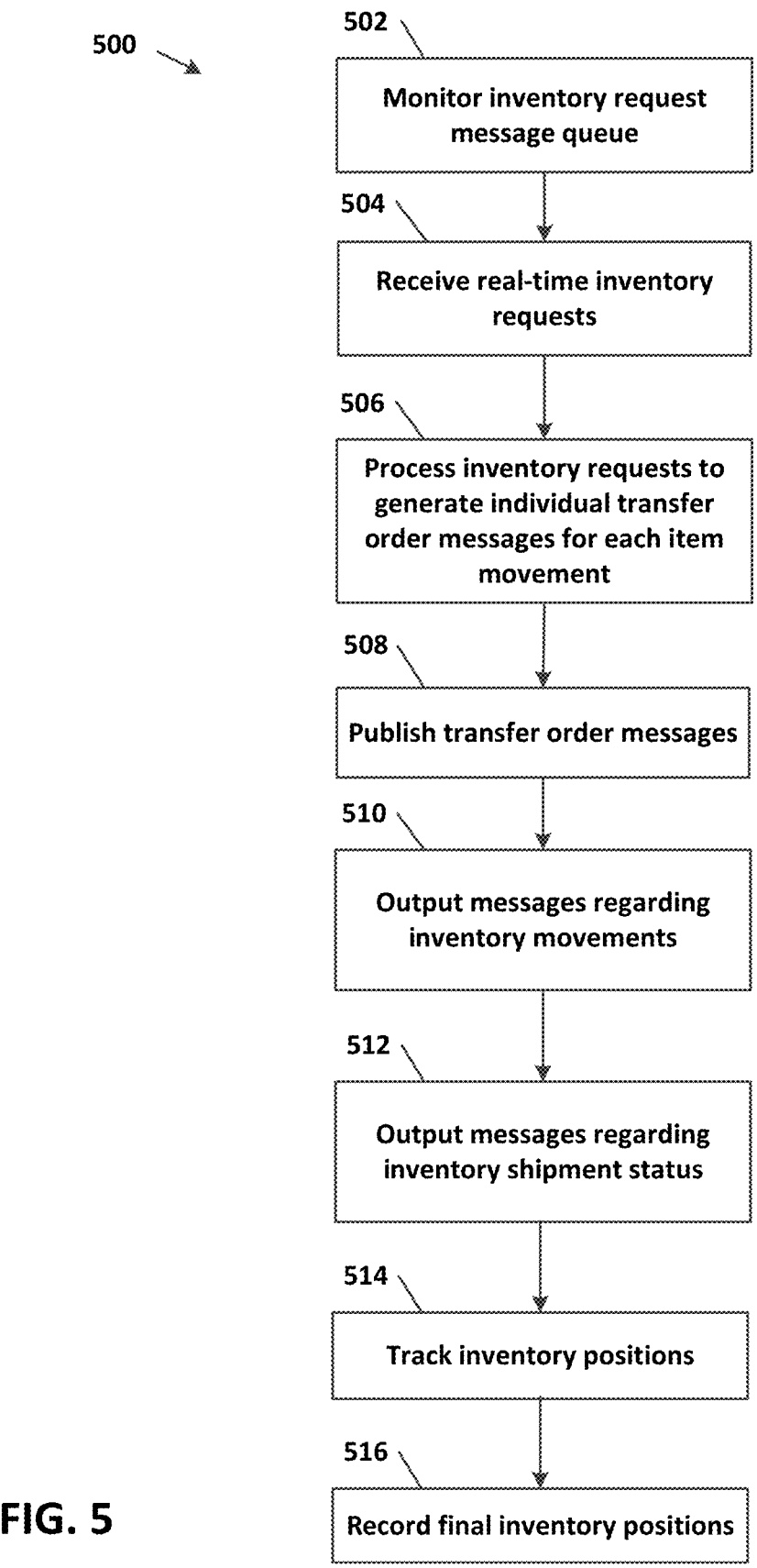
FIG. 5 is a flow chart of an example method of managing inventory transfers in a retail supply chain.

FIG. 5 displays a flow diagram of a method 500 of managing inventory transfers within a retail supply chain. The supply chain includes a plurality of retail locations and a plurality of distribution locations. The supply chain may be structured like the example supply chain depicted in FIG. 1. In some embodiments, the method 500 is performed by a supply chain management system such as the system 200 of FIG. 2.

At operation 502, an inventory request message queue is monitored. An inventory request message queue temporarily stores messages relating to transfer orders and purchase orders, centralizing communication between producers and consumers of the data associated with the requests. An example of a message queue can be implemented as a streaming data service queue implemented using the KAFKA® streaming data service from APACHE®.

At operation 504, real-time inventory requests are received. In exemplary embodiments, the replenishment management system 204 sends an inventory request to the inventory management system in response to demand signals. Inventory requests can be issued in response to either proactive demand signals or reactive demand signals.

Figure 6:
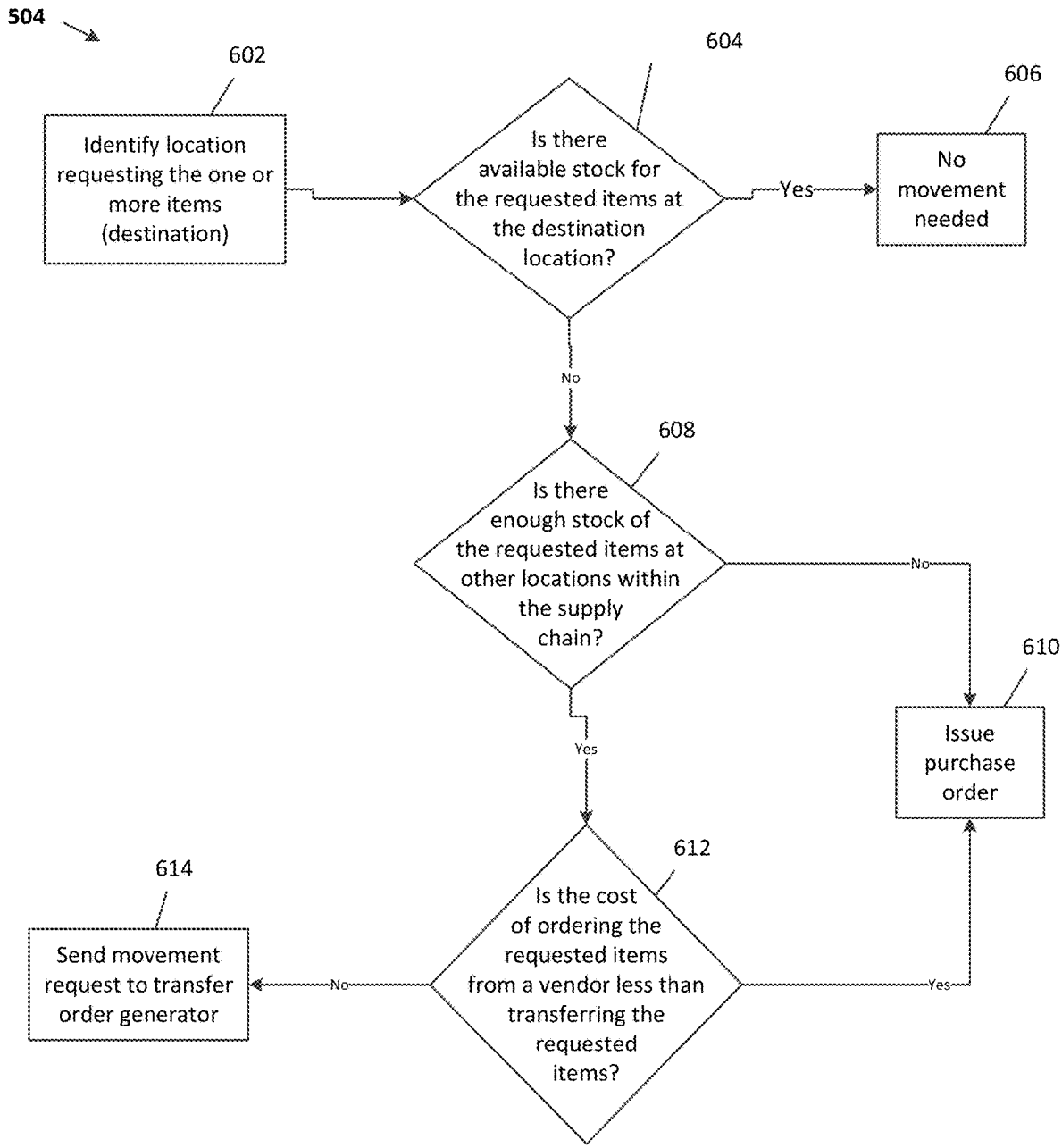
FIG. 6 is flow chart of an example method of analyzing inventory requests.

At operation 506, the inventory requests are processed to generate individual transfer order messages for each item movement. The inventory movement analyzer 303 operates in conjunction with information gathered from the inventory tracking engine 302 to determine which inventory movements are needed. FIG. 6 illustrates an example method 600 of determining whether inventory movements are needed to satisfy the inventory request. An example method 700 of processing inventory requests to identify individual transfers is presented in FIG. 7.

At operation 508, transfer order messages are published to a transfer order message queue. The transfer order message queue is accessed by ones or more store nodes. In some embodiments, the data in the transfer order message queue is accessed by the transportation management system to direct movement of inventory within the supply chain.

At operation 510, messages regarding inventory movements are output. An inventory movement processor (or analyzer) operates to output the messages to an inventory movement message queue.

At operation 512, messages regarding inventory shipment status are output. The inventory movement processor also operates to output the messages to a finance system 224.

Returning to FIG. 5, at operation 510 the transfer orders are output to the transportation management system 206. The transfer order outputter 352 submits the transfer order information for each transfer to the transportation management system 206. The transfer order information is also reported to the inventory tracking engine 302.

At operation 514, the inventory tracking engine 302 tracks the inventory positions of the items during the transfers. After receiving the transfer order information, the inventory tracking engine 302 monitors the origin locations and destination location to determine the status of the transfers. The transportation management system 206 reports when the items are loaded for transportation and when the items arrive and are unloaded at the destination.

At operation 516, the inventory tracking engine 302 records the final inventory positions of the transferred items in the inventory data store 314.

FIG. 6 illustrates an example method 600 of determining whether inventory movements are needed to satisfy the inventory request. At operation 602, the location requesting additional stock of one or more items is identified as the destination location.

At operation 604, the inventory movement analyzer 303 determines whether there is available stock for the requested item(s) at the destination location. The inventory movement analyzer 303 receives information from the inventory tracking engine 302 regarding the inventory levels at the destination location for the requested item(s). If there is available stock at the destination location, there is no need for additional stock to be moved to the destination location to satisfy the inventory request and the method proceeds to operation 606. If there is not sufficient stock at the destination location, the method proceeds to operation 608.

At operation 608, the inventory movement analyzer 303 operates in conjunction with the inventory tracking engine 302 to determine if there is sufficient stock of the requested item(s) at other locations within the retail supply chain. The inventory tracking engine 302 accesses up-to-date information from the inventory data store 314 regarding the inventory levels of the requested items at every node within the supply chain. If there is not sufficient stock with the supply chain, the method proceeds to operation 610 and a purchase order is generated. If there is sufficient stock, the method proceeds to operation 612.

At operation 612, the inventory movement analyzer 303 operates in conjunction with the cost calculator 310 to determine whether the cost of ordering the requested items from a vendor is less than the cost of transferring the requested items from other locations within the supply chain. The cost calculator weighs 310 examines opportunity costs and direct costs. If the cost of ordering the items is less, the method proceeds to operation 610 and a purchase order is issued to the vendor. If the cost of transferring the requested items is less, the method proceeds to operation 614 and a movement request is sent to the transfer order generator 304.

Figure 7:
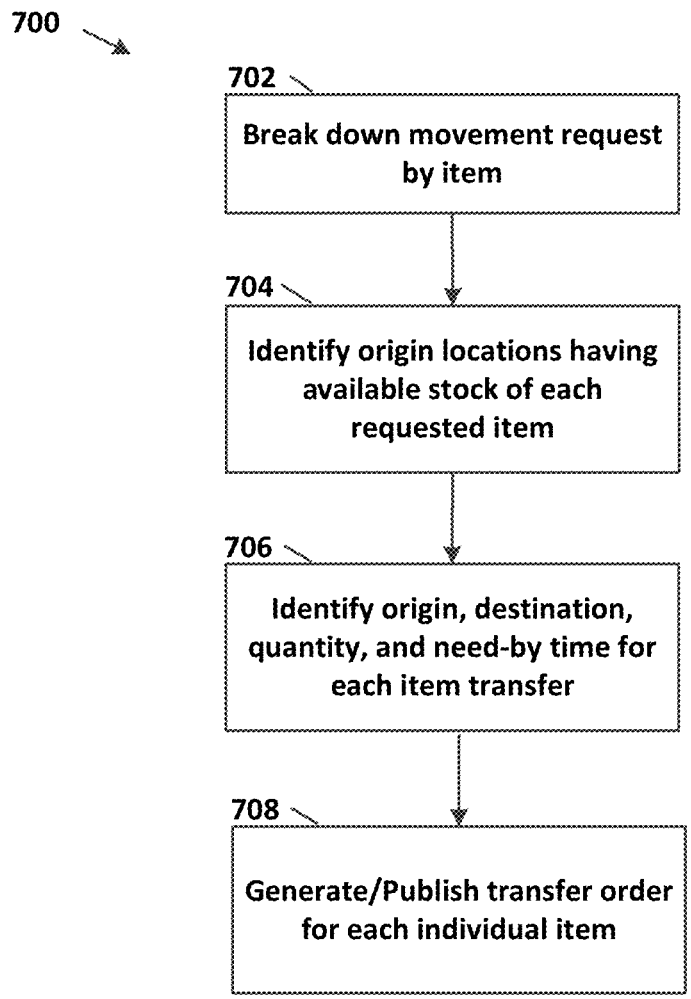
FIG. 7 is a flow chart of an example method of processing movement requests.

FIG. 7 illustrates an example method 700 of processing inventory requests to identify individual transfers.

At operation 702, the inventory requests are processed into individual transfer orders by individual item. An inventory request may include more than one item that is being requested by one destination location. The individual items of the movement request are separated out by the transfer processor 352.

At operation 704, the origin locations having available stock of each requested item are identified. The transfer processor 352 communicates with the inventory tracking engine 302 to determine which nodes have items available for delivery to the destination location.

At operation 706, the transfer processor 352 determines an origin location, destination location, quantity, and need-by time for each item transfer. The origin location is the node at which the needed item is loaded for transport. The destination location is the node that is requesting additional stock of the needed item. The quantity of the item is determined by the requesting location. The need-by time is the time by which the items need to be delivered to the destination location. The need-by time may be influenced by multiple factors such as shipping delivery dates, stocking deadlines, transportation schedules, and others. The transfer processor 352 works with the transportation management system 206 to determine if the items can be moved from the origin location to the destination location within the need-by time.

At operation 708, individual transfer order messages are published for each item. The transfer processor 352 submits the transfer order information to the transfer order outputter 354. The transfer order information includes the origin location, destination location, quantity, and need-by time for each item.

Figure 8:
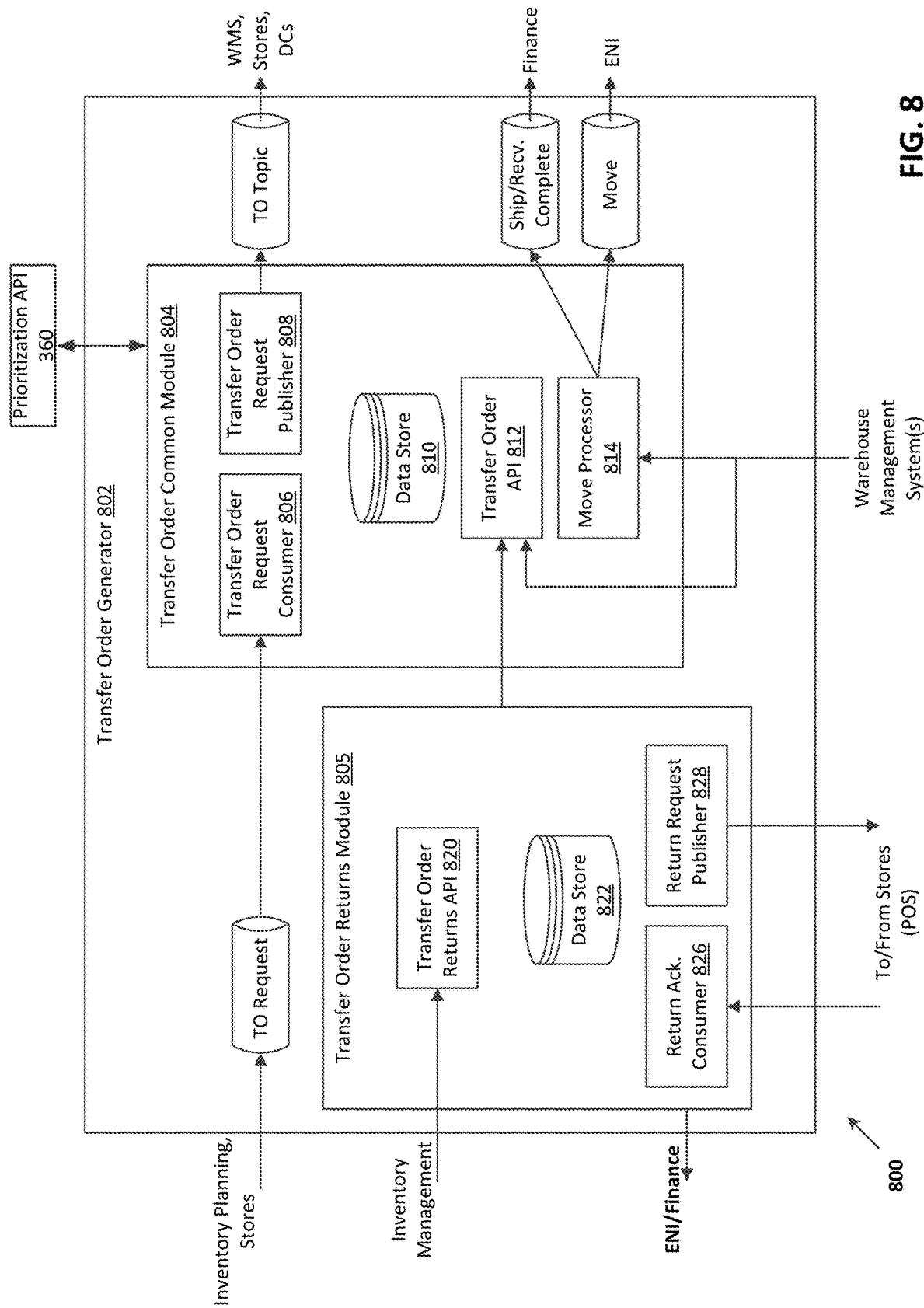
FIG. 8 illustrates a schematic diagram of an example transfer order system.

Referring now to FIG. 8, a particular implementation of a transfer order system 800 is shown, in accordance with an example embodiment of the present disclosure. The transfer order generator 800 can be used, for example, as transfer order generator 304 within the inventory management system 202 of FIG. 3.

In the example shown, the transfer order system 800 includes a transfer order generator 802 that generates transfer orders in response to signals received from other portions of an overall supply chain management system, such as are seen in FIGS. 1-3. In the embodiment shown, the transfer order generator 802 includes a transfer order common module 804 and a transfer order returns module 805.

The transfer order common module 804 receives transfer order request messages from a variety of external systems, such as an inventory planning system or store point of sale systems. A transfer order request publisher 808 publishes a transfer order and transmits the transfer order to a relevant location at which the transfer order is processed—e.g., a retail site (store), a flow center (via a warehouse management system, or WMS), or a receive center. A data store 810 can be used to store active and processed transfer orders, e.g., to track intra-enterprise shipments or goods movements. The transfer order request is received at a request consumer 806 for processing. Additionally, a transfer order API 812 can be accessed to receive data related to a transfer order, based on the data in the data store 810. Once the transfer order is processed at the relevant site, signals received from the warehouse management system at the transfer order API 812, and at a move processor 814, can update the current status of the transfer order (e.g., to indicate that the transfer has completed successfully) and to update external systems, such as a finance system (via a notification that shipment has completed) or an enterprise inventory system (which tracks current location of goods within the enterprise, as noted above). In some embodiments, information accessed through the transfer order API 812 is aggregated. That aggregated information can be provided to finance systems or other external systems in an aggregated form on an as-needed basis via the API 812, to improve convenience and allow the transfer order systems described herein to coexist within an enterprise that does not perform per-item, high throughput operations across all subsystems of the enterprise network (e.g., by aggregating finance information for accounting, etc.).

As noted above, the transfer order common module 804 may access a prioritization API 360 to determine a prioritization of transfer orders that are published by transfer order request publisher 808. In example implementations, the prioritization API 360 may be published by a store, an inventory planning group, or may be feedback from warehouse management systems based on observed inventory levels and anticipated demand at a variety of locations. In example embodiments, the transfer order common module will publish transfer orders either on a per-order basis or on a grouped basis to a transfer order streaming data topic (designated "TO Topic" in FIG. 8); the transfer orders may be reordered according to priority as published, or may include prioritization information within each transfer order for purposes of prioritized handling by the warehouse management systems, stores, distribution centers, or other nodes within an enterprise network.

The transfer order returns module 805 receives signals from point of sale systems (e.g., at stores or online order processing systems) at a return acknowledgement consumer module 826, and transmits return request confirmations at a return request publisher 828. Returns also trigger an update of a return data store 822, and transmit a message to both finance (to realize a cost/sale update) and to an enterprise inventory system to track the location of returned goods. An inventory management system can additionally access a transfer order returns API 820 to view status of returns. The transfer order returns module 805 can also access the transfer order API 812 to view status of transfer orders and/or integrate returns with transfer orders, e.g. to initiate transfer of returned goods from a store to another enterprise location.

Referring to FIGS. 1-8 generally, it is noted that the present disclosure has a number of advantages relative to existing transfer order systems. In particular the current disclosure provides for integration of automated transfer order generation for each item and each movement of that item among locations of an enterprise supply chain, and publishes APIs to other portions of an overall supply chain management system, thereby allowing those other portions of the overall system to track status of transferred goods at an individual item basis at any instantaneous time.

Additionally, the transfer orders generated according to the present disclosure further automatically update enterprise inventory systems as well as receive signals from an inventory management application that directs planned locations of goods for item fulfillment throughout the supply chain. This integration of finance, planning, inventory, and point of sale systems through automated transfer order generation allows for improved efficiency of processing by numerous of those systems and improved accuracy as to the current (instantaneous) state of the supply chain.

Another advantage of the methods and systems provided herein is the real-time per-item processing of transfer orders. Individual transfer orders are generated for each and every individual item that is to be moved within a supply chain. This granularity ensures that items are positioned within a supply chain so that they are where they are most likely to be needed. Unlike other warehouse management systems, the current methods and systems utilize a database that can handle the multitude of individual transfer order messages that are needed to implement the real-time, per-item transfers for large volumes of items across a wide variety of locations. The transfer orders described herein are used for individual transfers between any two points, and as such, are configured for high volume throughput for management on a per-item basis.

The systems and methods described also provide the advantage of prioritizing transfer orders to ensure that the highest priority item movements are handled first. Other advantages are apparent as well from the above disclosure and claims included herewith.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features.

Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of managing inventory transfers in real-time within an enterprise supply chain including a plurality of locations including a plurality of retail locations and a plurality of distribution locations, the method comprising:

receiving a plurality of transfer order requests from an inventory movement analyzer operating on a computing system, the transfer order requests comprising a message from a topic of a streaming data service;

retrieving, at a transfer request processor operating on the computing system, one of the transfer order requests, the transfer order request identifying two or more items to be transported from a first location to a second location;

processing the one transfer order request, at the transfer request processor, to generate two or more individual transfer order messages, each transfer order message identifying a single item that is to be transported from the first location to the second location;

storing the individual transfer order messages in a temporary database;

publishing, using a transfer order publisher, the individual transfer order messages to a transfer order streaming data topic accessible by at least a transportation management system;

receiving and recording updates received from a plurality of external systems regarding a status of item movements corresponding to the individual transfer order messages in the temporary database; and making the updates to the temporary database available to the plurality of external systems via an application programming interface (API).

2. The method of claim 1, wherein the transfer order requests are received in real time in response to demand signals issued from a demand forecasting engine in the form of inventory adjustments.

3. The method of claim 1, wherein the transfer order requests are received in real time in response to demand signals issued by one or more of a point of sale system and an online order system in the form of sales.

4. The method of claim 1, wherein processing the transfer order request further comprises:
identifying an origin location, a destination location, a quantity, and a need-by-time for each transfer order; and
determining whether a cost of transferring items within the supply chain is less expensive than ordering new items from vendors.

5. The method of claim 4, wherein the costs include at least lost opportunity costs of having the item at the distribution location having a surplus, the cost of transporting the item, and the difference in cost for storing the item at the distribution location having a surplus versus the distribution location having a deficit.

6. The method of claim 1, further comprising prioritizing the individual transfer order messages so that they are processed in order of priority by the transportation management system.

7. A system for managing operation of a supply chain in an enterprise including a plurality of locations, the system comprising:
a transfer order generation system executing on a computing device, the transfer order generation system comprising:
a transfer order common module executing within the transfer order generation system, the transfer order common module configured to:
receive a plurality of transfer order requests, wherein the transfer order requests comprise a message from a topic of a streaming data service;
retrieve one of the transfer order requests, the transfer order request identifying two or more items to be transported from a first location to a second location;
process the one transfer order request to generate two or more corresponding individual transfer order messages, each transfer order message identifying a single item that is to be transported from the first location to the second location;
store the individual transfer order messages in a temporary database;
publish the individual transfer order messages to a transfer order streaming data topic accessible by at least a transportation management system;
receive and record updates received from a plurality of external systems regarding a status of item movements corresponding to the individual transfer order messages in the temporary database; and
make the updates to the temporary database available to the plurality of external systems via an application programming interface (API); and
a data store managed by the transfer order common module, the data store including the temporary storage for the individual transfer order messages and status information regarding transfer orders.

8. The system of claim 7, wherein the transfer order generation system is included within an inventory management system.

9. The system of claim 7, wherein the transfer order generation system further comprises a prioritization API that is configured to prioritize the individual transfer order messages so that they are processed in order of priority by the transportation management system.

10. The system of claim 7, wherein the transfer order generation system further includes a transfer order return module communicatively connected to an enterprise inventory system, a finance system, and a point of sale system.

11. The system of claim 10, wherein the transfer order generation system generates transfer orders in response to real-time demand signals received from a point of sale system or online ordering system.

12. The system of claim 11, wherein the demand signals include proactive demand signals and reactive demand signals.

13. The system of claim 7, wherein the inventory movements are used to replenish both in-store purchase and online orders.

14. The system of claim 7, wherein the database is a noSQL document indexing database.

15. A non-transitory computer-readable storage medium comprising computer-executable instructions which, when executed by a computing system, cause the computing system to perform a method of managing inventory replenishment, the method comprising:
receiving a plurality of transfer order requests from an inventory movement analyzer operating on a computing system, the transfer order requests comprising a message from a topic of a streaming data service;
retrieving, at a transfer request processor operating on the computing system, one of the transfer order requests from the inventory movement topic, the transfer order request identifying two or more items to be transported from a first location to a second location;
processing the transfer order request, at the transfer request processor, to generate two or more individual transfer order messages, each transfer order message identifying a single item that is to be transported from the first location to the second location;
storing the individual transfer order messages in a temporary database; and publishing, using a transfer order publisher, the individual transfer order messages to a transfer order streaming data topic accessible by a transportation management system;

receiving and recording updates received from a plurality of external systems regarding a status of item movements corresponding to the individual transfer order messages in the temporary database; and making the updates to the temporary database available to the plurality of external systems via an application programming interface (API).

16. The non-transitory computer-readable storage medium of claim 15, wherein the transfer order requests are generated in response to demand signals received from one or more of a demand forecasting engine, a point of sale system, and an online order system.

17. The non-transitory computer-readable storage medium of claim 15, wherein processing the transfer order request further comprises determining whether there is sufficient stock at a destination location to satisfy the transfer order request;

determining whether there is sufficient stock within the supply chain to satisfy the transfer order request; and determining whether the cost of transferring items within the supply chain is less expensive than ordering new items from vendors.

18. The non-transitory computer-readable storage medium of claim 15, wherein the updates regarding inventory movements are generated by:

receiving transfer order information;

receiving reports of items being loaded at the origin location; and receiving reports of items being unloaded at the destination location.

19. The non-transitory computer-readable storage medium of claim 15, wherein the method further comprises prioritizing the individual transfer order messages by accessing a prioritization API so that they are processed in order of priority by the transportation management system.

* * * * *